(12) United States Patent
Hann

(10) Patent No.: US 7,230,953 B1
(45) Date of Patent: Jun. 12, 2007

(54) METHOD AND SYSTEM FOR CONTROLLING UTOPIA BUSES

(75) Inventor: William P. Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 10/112,523

(22) Filed: Mar. 28, 2002

(51) Int. Cl.
*H04L 12/56* (2006.01)

(52) U.S. Cl. ........................ 370/421; 370/463

(58) Field of Classification Search ............ None
See application file for complete search history.

(56) References Cited

U.S. PATENT DOCUMENTS

| | | | |
|---|---|---|---|
| 4,406,004 A * | 9/1983 | Hall et al. ................. 370/249 |
| 5,485,456 A | 1/1996 | Shtayer et al. ............. 370/60 |
| 5,959,987 A * | 9/1999 | Humphrey et al. ......... 370/352 |
| 5,970,072 A * | 10/1999 | Gammenthaler et al. ... 370/537 |
| 6,269,096 B1 * | 7/2001 | Hann et al. ................ 370/366 |
| 6,490,283 B1 * | 12/2002 | Ganor et al. ............. 370/395.1 |
| 6,597,689 B1 * | 7/2003 | Chiu et al. ................. 370/354 |
| 6,741,599 B1 * | 5/2004 | Dunn et al. .............. 370/395.6 |
| 6,981,087 B1 * | 12/2005 | Heitkamp et al. .......... 710/301 |
| 7,073,022 B2 * | 7/2006 | El-Batal et al. ............. 711/114 |
| 2002/0021661 A1 * | 2/2002 | DeGrandpre et al. ....... 370/219 |
| 2002/0103988 A1 * | 8/2002 | Dornier ....................... 712/38 |
| 2003/0048802 A1 * | 3/2003 | Shenoi ....................... 370/458 |
| 2005/0165995 A1 * | 7/2005 | Gemelli et al. ............. 710/305 |

\* cited by examiner

*Primary Examiner*—Hassan Kizou
*Assistant Examiner*—Anthony Sol
(74) *Attorney, Agent, or Firm*—Baker Botts L.L.P.

(57) ABSTRACT

According to one embodiment of the invention, a system for managing communication in a network line card is provided. The system includes at least two UTOPIA bus controllers. Each UTOPIA bus controller is operable to control a particular one of a plurality of UTOPIA buses. The system also includes at least two sets of UTOPIA physical devices associated with respective ones of the UTOPIA bus controllers. Each set of UTOPIA physical devices is coupled to a respective one of the UTOPIA buses. The system also includes a multiplexer coupled to the UTOPIA bus controllers. The system also includes a same pin coupling each of the UTOPIA buses to the respective UTOPIA bus controllers through the multiplexer.

26 Claims, 5 Drawing Sheets

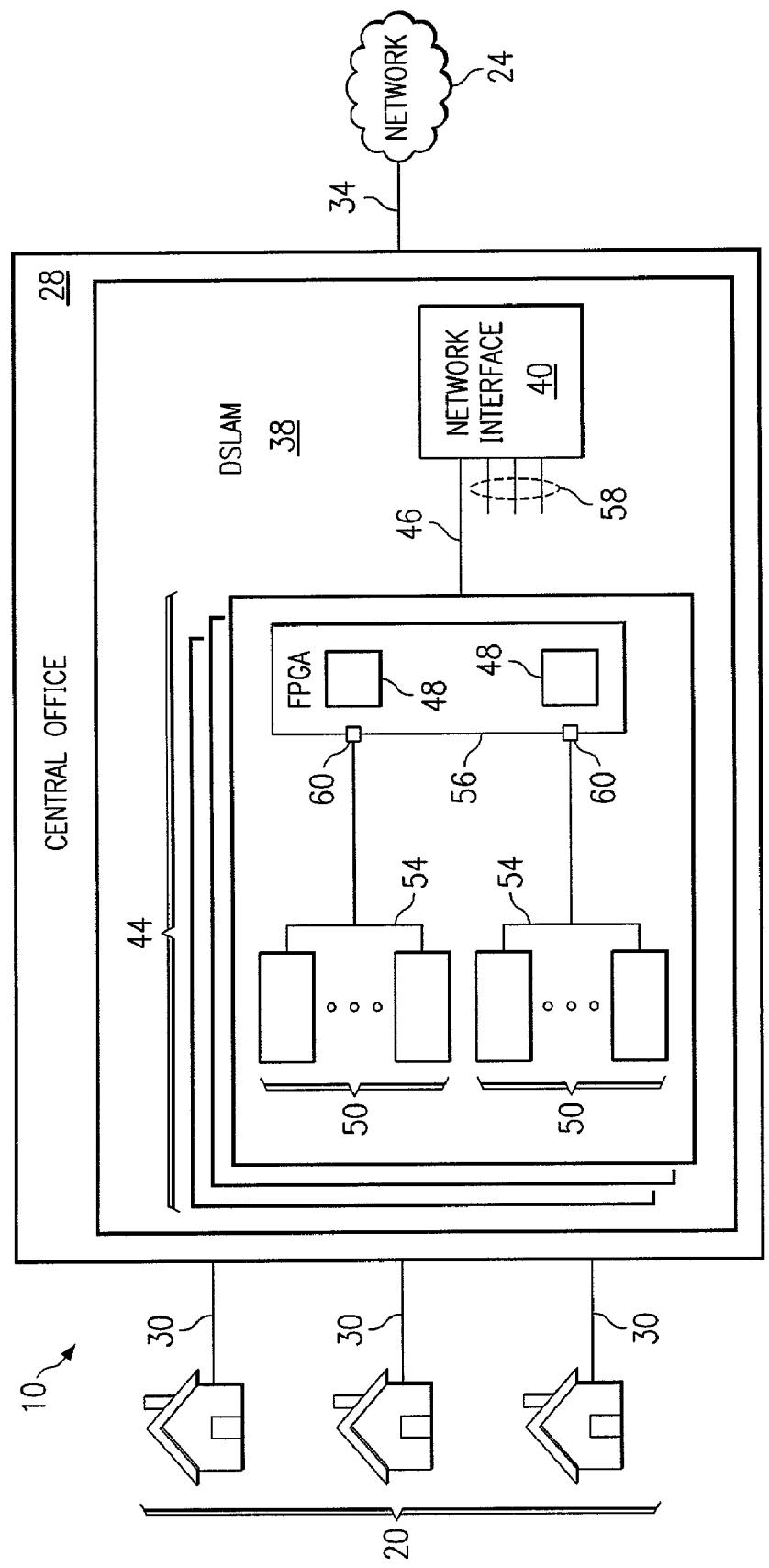

METHOD AND SYSTEM FOR CONTROLLING UTOPIA BUSES

TECHNICAL FIELD OF THE INVENTION

This invention relates generally to telecommunications and more particularly to a method and system for controlling UTOPIA buses.

BACKGROUND OF THE INVENTION

A communication server provides access to communication facilities. For example, a communication server having a bank of modems may provide subscriber access to the modems for data communication. As communication networks provide greater connectivity and access to information, there is an increasing demand for data communication at higher rates. One solution to providing increased data rates is adopting improved communication techniques using the existing hardware infrastructure. For example, digital subscriber line (DSL) technology provides faster data service over existing twisted pair wiring. Implementation of DSL technology requires a communication server that may operate as an interface between the individual DSL subscribers and the Internet Protocol (IP) network.

The increasing demand for DSL service may be met by communication servers that are capable of accommodating a higher number of subscribers. Such increased capability requires a higher number of modems, which means that more buses and their respective controllers may be added to the communication servers. However, each addition of a bus and a bus controller increases the size and the pin count of the device that implements the bus or the bus controller within the communication servers. Furthermore, a higher number of pins requires more gates within the device. As such, the cost of manufacturing the communication server is increased.

SUMMARY OF THE INVENTION

According to one embodiment of the invention, a system for managing communication in a network line card is provided. The system includes at least two UTOPIA bus controllers. Each UTOPIA bus controller is operable to control a particular one of a plurality of UTOPIA buses. The system also includes at least two sets of UTOPIA physical devices associated with respective ones of the UTOPIA bus controllers. Each set of UTOPIA physical devices is coupled to a respective one of the UTOPIA buses. The system also includes a multiplexer coupled to the UTOPIA bus controllers. The system also includes a same pin coupling each of the UTOPIA buses to the respective UTOPIA bus controllers through the multiplexer.

According to another embodiment of the invention, a method for saving space on a network line card in a communications server is provided. The method includes providing a plurality of UTOPIA physical devices coupled to respective UTOPIA buses. Each one of the UTOPIA buses is coupled to a same pin on an integrated circuit that has a plurality of UTOPIA bus controllers. The method also includes multiplexing a plurality of signals transmitted from each of a plurality of the UTOPIA bus controllers for receipt by respective ones of the UTOPIA physical devices. The multiplexed transmissions flow through the same pin.

Some embodiments of the invention provide numerous technical advantages. Some embodiments may benefit from some, none, or all of these advantages. For example, according to one embodiment, a lower required pin count reduces the production cost of devices that are used to implement UTOPIA buses or UTOPIA bus controllers. Furthermore, such a lower pin count saves board space on a line card, which allows the digital subscriber line access multiplexer to be more compact while achieving the same or greater level of communication interface capability.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIG. 1 is a block diagram of an embodiment of a telecommunications system according to the teachings of the invention;

DETAILED DESCRIPTION OF EXAMPLE EMBODIMENTS OF THE INVENTION

Figure 2A:
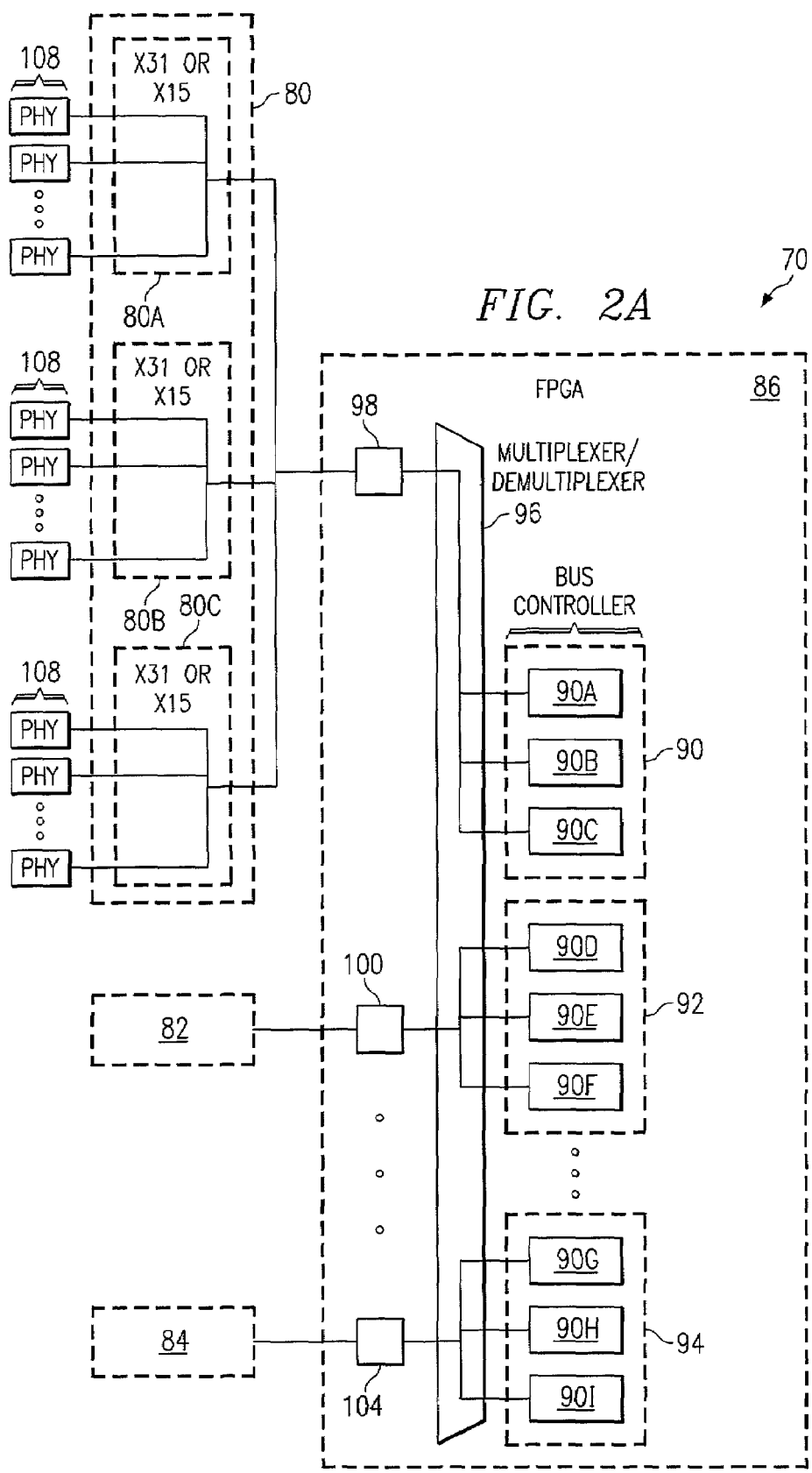
FIG. 2A is a block diagram showing additional details of an embodiment of the line card shown in FIGURE

Embodiments of the invention are best understood by referring to FIGS. 1 through 4B of the drawings, like numerals being used for like and corresponding parts of the various drawings.

FIG. 1 is a block diagram of a telecommunications system 10 according to the teachings of the invention. Telecommunications system 10 includes a plurality of homes or businesses (or other locations) 20 (referred to herein as "customer premises 20") coupled to a network 24, such as an Internet Protocol network. A central office 28 receives a plurality of telephone lines 30 coupled to respective ones of customer premises 20. Network 24 couples to central office 28 through a trunk line 34. Trunk line 34 may be any suitable communication link that may carry Internet protocol traffic, including OC3, DS3, T1 (STM1, E3, E1, in Europe).

Central office 28 comprises, among other components not explicitly shown, a digital subscriber line access multiplexer 38, referred to from herein as "DSLAM 38." DSLAM 38 comprises at least one network interface card 40 and a plurality of line cards 44 coupled to network interface card 40 by a link 46. Link 46 may be a UTOPIA bus connected across a backplane of DSLAM 38, in one embodiment; however, link 46 may take other forms. For example, a plurality of buses 58, such as high speed serial buses, may couple line cards 44 to network interface card 40.

DSLAM 38 allows communication between customer premises 20 and network 24. Network interface card 40 communicates with network 24 over line 34. Network interface card 40 receives data from network 24 over line 34 and communicates it to a particular one of line cards 44 associated with the intended destination of the data. Conversely, network interface card 40 receives data from line cards 44 and communicates it over line 34 to network 24. Network interface card 40 also contains the IP/ATM switch fabric that manages and processes packets and cells. In this embodiment, network interface card 40 manages all aspects of DSLAM 38, including system help, system performance, switch help and performance, and network communications.

Line cards 44 receive communications over telephone lines 30 from customer premises 20. Then line cards 44 communicate that information to network interface card 40 over link 46 for eventual transmission to network 24. Conversely, line cards 44 receive communications from network 24 through network interface card 40 and communicate them to a particular one of customer premises 20 over line 30.

To allow communication between network interface card 40 and customer premises 20, each line card 44 includes one or more UTOPIA bus controllers 48 that are coupled to a plurality of UTOPIA physical devices 50 (referred to from herein as "PHYs") by one or more UTOPIA buses 54. An example of PHY 50 is a modem. UTOPIA bus controllers 48 may be implemented using a field programmable gate array 56 ("FPGA") having groups of pins 60 (referred to herein as "pin groups.") Each pin group 60 includes a plurality of pins (not explicitly shown in FIG. 1.) Pin groups 60 are used to couple UTOPIA bus controllers 48 to UTOPIA buses 54. Although a FPGA may be used to implement UTOPIA bus controllers 48, other suitable forms, such as an application specific integrated circuit (ASIC), may be used. FPGA 56 is used herein as a representative example of implementing UTOPIA bus controllers 48.

UTOPIA bus controllers 48 control the transfer of data that are received from network interface card 40 to the various PHYs 50. Data may be transferred from UTOPIA bus controllers 48 to PHYs 50 over UTOPIA buses 54. One UTOPIA bus controller 48 controls one associated UTOPIA bus 54, and each one of PHYs 50 operates as a slave of its associated UTOPIA bus controller 48 through UTOPIA bus 54. This association is generally established through the links provided by FPGA 56, such as pin groups 60. Because two UTOPIA buses 54 are shown in FIG. 1, there are two UTOPIA bus controllers 48 that are associated with the two UTOPIA buses 54; however, more or less pairs of UTOPIA buses 54 and UTOPIA bus controllers 48 may be utilized.

In some embodiments, each UTOPIA bus 54 may accommodate up to thirty-one ports. As such, where each PHY 50 has one port, up to thirty-one PHYs 50 may be coupled to each UTOPIA bus 54. However, more or less PHYS may be coupled to each UTOPIA bus 54. For example, in an embodiment using the UTOPIA 3 standard, more than thirty-one PHYs may be coupled to a UTOPIA bus.

Each PHY 50 is operable to provide data received from the associated UTOPIA bus controller 48 to an associated one of customer premises 20 over telephone line 30. Each PHY 50 is also operable to receive data from an associated one of customer premises 20 and transmit that data over the associated UTOPIA bus 54 to the associated UTOPIA bus controller 48.

As described above, each UTOPIA bus controller 48 uses its associated UTOPIA bus 54 to communicate with any PHY 50 that is coupled to the associated UTOPIA bus 54. The communication is conducted as follows. A polling engine (not explicitly shown) within UTOPIA bus controller 48 polls a particular PHY 50, such as a modem, by placing the PHYs 50 address on UTOPIA bus 54. When the PHY 50 sees its own address on UTOPIA bus 54, it places a cell available signal (referred to herein as "CLAV") on UTOPIA bus 54 for receipt by the polling engine. In response, the polling engine places the same address again on UTOPIA bus 54, indicating that the addressed PHY 50 is selected to receive data. In response to selecting a particular PHY 50 to receive data, data that has been received from network interface card 40 is transferred to the selected PHY 50 over the particular UTOPIA bus 54 that is associated with the selected PHY 50. This procedure is repeated for each recipient of data. Thus, for example, if there were four customer premises associated with respective ones of PHYs 50 and each wanted to receive data, four separate polling, selection, and transfer of data steps are applied.

Conventionally, each UTOPIA bus 54 is coupled to its respective UTOPIA bus controller 48 by a pin group 60. As such, the number of pin groups 60 is equal to the number of bus—to bus controller pairs. For example, where there are two UTOPIA bus 54—UTOPIA bus controller 48 pairs, there are two pin groups 60 (as shown in FIG. 1). Each pin in one pin group 60 is dedicated to a particular purpose. For example, in pin group 60, a particular portion of the pins is used for transmitting data from UTOPIA bus controller 48 to its associated UTOPIA bus 54. Another particular portion of the pins is used for receiving data at UTOPIA bus controller 48 that are transmitted from its associated UTOPIA bus 54. Within the portion of pins for transmitting data from UTOPIA bus controller 48, there is a particular pin for carrying each of the following types of signal: Bus enable signals, start of cell ("SOC") signals, transmit enable signals, cell available ("CLAV") signals, data, and addresses. Within the portion of pins for receiving data at UTOPIA bus controller 48 from its respective UTOPIA bus 54, there is a particular pin for carrying each of the following types of signal: Bus enable signals, SOC signals, transmit enable signals, CLAV signals, data, and addresses. As such, in one embodiment, there may be twelve pins in one pin group 60. However, depending on the particular configuration of a line card 44, more or less number of pins may be in pin group 60, as well known by a skilled artisan.

To accommodate a higher number of customer premises 20, the number of PHYs 50 may increase. To receive more PHYs 50, the number of UTOPIA buses 54 may increase. An increase in the number of UTOPIA buses 54 leads to an equal increase in the number of UTOPIA bus controllers 48 because, as discussed above, each UTOPIA bus 54 requires an associated UTOPIA bus controller 48. In turn, the increase in the number of UTOPIA bus controllers 48 leads to an increase in the number of pin groups 60. This is because each UTOPIA bus controller 48 of FPGA 56 requires a link, such as pin group 60, over which UTOPIA bus controller 48 may control its associated UTOPIA bus 54. Depending on the number of pins in a group that couples one UTOPIA bus 54 and its UTOPIA bus controller 48, the increase in the pin count may be significant. For example, if the number of bus—bus controller pairs increases from two to five, then there would be five pin groups 60 to accommodate the association of each of the five bus—bus controller pairs. In an embodiment where one pin group 60 has twelve pins, having three more pin groups 60 increases the pin count of FPGA 56 by thirty-six pins. An increase in the pin count is not desirable because having more pins increases the size of FPGAs. A larger FPGA occupies more circuit board space, which creates challenges in circuit board design. Furthermore, a larger FPGA with more pins also has more internal gates, which are not necessary and increase the cost of manufacturing FPGAs.

According to the teachings of the invention, a method and system are provided that may be used to increase the number of UTOPIA buses 54 and the respective number of UTOPIA bus controllers 48 without increasing the pin count of FPGA 56. This is advantageous because lowering the pin count reduces the production cost of FPGAs. Furthermore, a lower pin count saves board space on a line card, which allows the DSLAM to be more compact while achieving the same or greater level of communication interface capability. Additional details of example embodiments of the system and method are described in greater detail below in conjunction with FIGS. 2A through 4B.

FIG. 2A is a block diagram showing an embodiment of a line card 70 that may be used in DSLAM 38 of FIG. 1. In some embodiments of the invention, line card 70 comprises a plurality of UTOPIA bus groups, such as UTOPIA bus groups 80, 82, and 84, and a FPGA 86 that is coupled to UTOPIA bus groups 80, 82, and 84. FPGA 86 comprises UTOPIA bus controller groups, such as UTOPIA bus controller groups 90, 92, and 94, a multiplexer/demultiplexer 96 (referred to from herein as "MUX/DEMUX 96"), and pin groups 98, 100, and 104. Each one of pin groups 98, 100, and 104 has the number of pins that is no greater than the number required to accommodate the communication between one UTOPIA bus and one UTOPIA bus controller in a particular line card. As described above in conjunction with one embodiment of line card 44, there may be twelve pins in each one of pin groups 98, 100, and 104, in one embodiment.

One UTOPIA bus group is coupled to one UTOPIA controller group so that the one UTOPIA controller group may control the associated UTOPIA bus group. For example, in one embodiment, UTOPIA bus group 80 is coupled to UTOPIA bus controller group 90 through MUX/DEMUX 96 and pin group 98. UTOPIA bus group 82 is coupled to UTOPIA bus controller group 92 through MUX/DEMUX 96 and pin group 100. UTOPIA bus group 84 is coupled to UTOPIA bus controller group 94 through MUX/DEMUX 96 and pin group 104. Although FIG. 2 shows three UTOPIA bus groups 80, 82, and 84 and their respectively coupled UTOPIA bus controller groups 90, 92, and 94, more or less of such bus—bus controller pairs may be used in other embodiments of the invention.

In one embodiment, UTOPIA bus group 80 comprises UTOPIA buses 80A through 8C; however, more or less UTOPIA buses may be in a UTOPIA bus group, such as UTOPIA bus group 80. UTOPIA bus groups 82 and 84 may be formed in a similar manner to UTOPIA bus group 80. In one embodiment, UTOPIA bus controller group 90 comprises UTOPIA bus controllers 90A through 90C; however, more or less UTOPIA bus controllers may be in a UTOPIA bus controller group, as long as there are enough UTOPIA bus controllers to control each UTOPIA bus in a particular UTOPIA bus group that is associated with UTOPIA bus controller group 90. In this embodiment, UTOPIA bus controller group 90 has three UTOPIA bus controllers 90A through 90C because UTOPIA bus group 80 has three UTOPIA buses 80A through 80C. UTOPIA bus 80A is controlled by UTOPIA bus controller 90A. UTOPIA bus 80B is controlled by UTOPIA bus controller 90B. UTOPIA bus 80C is controlled by UTOPIA bus controller 90C. In one embodiment, each one of UTOPIA bus controllers 90A through 90C has an operating clock rate. For example, the operating clock rate of each one of UTOPIA bus controllers 90A through 90C may be 25 MHz. UTOPIA bus controller groups 92 and 94 may be similar to UTOPIA bus control group 90. Furthermore, the relationship between UTOPIA bus controller group 92 and its associated UTOPIA bus group 82 may be similar to that of UTOPIA bus controller group 90 and its associated UTOPIA bus group 80. The relationship between UTOPIA bus controller group 94 and its associated UTOPIA bus group 84 may be similar to that of UTOPIA bus controller group 90 and its associated UTOPIA bus group 80.

In operation, UTOPIA bus controllers 90A through 90C transmit to MUX/DEMUX 96 the data or any other type of signal intended for their respectively associated UTOPIA buses 80A through 80C. Upon receiving the data from UTOPIA bus controllers 90A through 90C, MUX/DEMUX 96 multiplexes the data so that the data can be transmitted over a single group of pins, such as pin group 98. Additional details of multiplexing signals over pin group 98 are provided below, in conjunction with FIGS. 2B and 3.

In one embodiment, MUX/DEMUX 96 multiplexes the data by performing a time division multiplex ("TDM"). TDM refers to multiplexing using a carrier signal that comprises a number of time slots. Each time slot is occupied by a particular signal of a particular transmitter, such as UTOPIA bus controller 90A. MUX/DEMUX 96 may perform TDM by transmitting a carrier signal having a plurality of time slots, where UTOPIA bus controllers 90A, 90B, and 90C are each assigned approximately equal number of time slots that may be used to transmit their respective signals. Each one of UTOPIA buses 80A through 80C receives its respective signal from MUX/DEMUX 96. After receiving the respective signal, the signal received by the particular one of UTOPIA buses 80A through 80C is accepted by the intended PHY 108 that is associated with the particular one of UTOPIA buses 80A through 80C. As such, if TDM is utilized in the embodiment described here, each one of UTOPIA buses 80A through 80C receives signals from the respectively associated UTOPIA bus controllers 90A through 90C at only a third of the time.

In one embodiment where MUX/DEMUX 96 performs TDM, UTOPIA bus controllers 90A through 90C and UTOPIA buses 80A through 80C operate at faster clock rates than the original clock rates that were used before the introduction of MUX/DEMUX 96 to multiplex/demultiplex signals. The respective clock rates of UTOPIA bus controllers 90A through 90C and UTOPIA buses 80A through 80C prior to the introduction of MUX/DEMUX 96 are referred to herein as the "original clock rates." In one embodiment, the original clock rates may have been selected to accommodate a desired signal output rate of line card 44. As such, the desired output rate of a line card may equal the original clock rate, in some embodiments. For example, if line card 44 has a desired target output rate of 25 MHz for sending signals to network interface card 40 and to customer premises 20, then the original clock rates of UTOPIA buses 80A through 80C and UTOPIA bus controllers 90A through 90C may be 25 MHz. However, as stated above, performing TDM at the original clock rate may slow the output rate of line card 44 to a rate less than 25 MHz. Thus, using clock rates that are faster than the original clock rates may compensate for the decrease in speed of communication that may be attributed to performing TDM.

In one embodiment, each one of UTOPIA buses 80A through 80C and each one of UTOPIA bus controllers 90A through 90C operates at a faster clock rate that is equal to a multiple of the original clock rate and a number of UTOPIA bus-UTOPIA bus controller pairs whose signals are multiplexed. For example, in one embodiment, UTOPIA buses 80A through 80C and UTOPIA bus controllers 90A through 90C may have operated at 25 MHz prior to the introduction of MUX/DEMUX 96. The signals of three UTOPIA bus-UTOPIA bus controller pairs comprising UTOPIA bus controllers 90A through 90C and three UTOPIA buses 80A through 80C are multiplexed over pin group 98. As such, the new, faster clock rate for UTOPIA bus controllers 90A through 90C and UTOPIA buses 80A through 80C is 75 MHz. The reason for this is because, as stated above, each one of UTOPIA buses 80A through 80C receives signals from their respective UTOPIA bus controllers 90A through 80C at only a third of the time. As such, multiplying the original clock rate by three yields a clock rate that compensates for the decrease in speed of communication caused by the multiplexing of signals. In this example, the target output rate of 25 MHz may be maintained despite the multiplexing of signals. If there were four UTOPIA bus-UTOPIA bus controller pairs, then the new clock rate for those pairs would be four times the original clock rate of 25 MHz, or 100 MHz.

Although the embodiment of the invention described above uses 25 MHz as an example operating clock rate of the bus controllers in UTOPIA bus controller group 90, each one of UTOPIA bus controller groups 90, 92, and 94 may have different a operating clock rate than the other. Although UTOPIA bus group 80 and UTOPIA bus controller group 90 are used as representative examples in describing the operation of one embodiment of the invention, the description may apply to other UTOPIA bus groups, such as UTOPIA bus groups 82 and 84, and other UTOPIA bus controller groups, such as UTOPIA bus controller groups 92 and 94.

Associating, using one pin group, a group of UTOPIA buses with a group of respective UTOPIA bus controllers is advantageous because an FPGA is no longer required to provide a pin group for each pair of a UTOPIA bus and a UTOPIA bus controller. As described above, the number of UTOPIA buses in a UTOPIA bus group and the number of UTOPIA bus controllers in the associated UTOPIA bus controller group may be increased without adding more pin groups. As such, the overall number of UTOPIA buses may be increased to receive more PHYs 108 without increasing the pin count of an FPGA. A lower pin count reduces the production cost of FPGAs. Furthermore, a lower pin count frees more board space on a line card, which allows the DSLAM to be more compact while maintaining the same or increased level of communication interface capability.

Figure 2B:
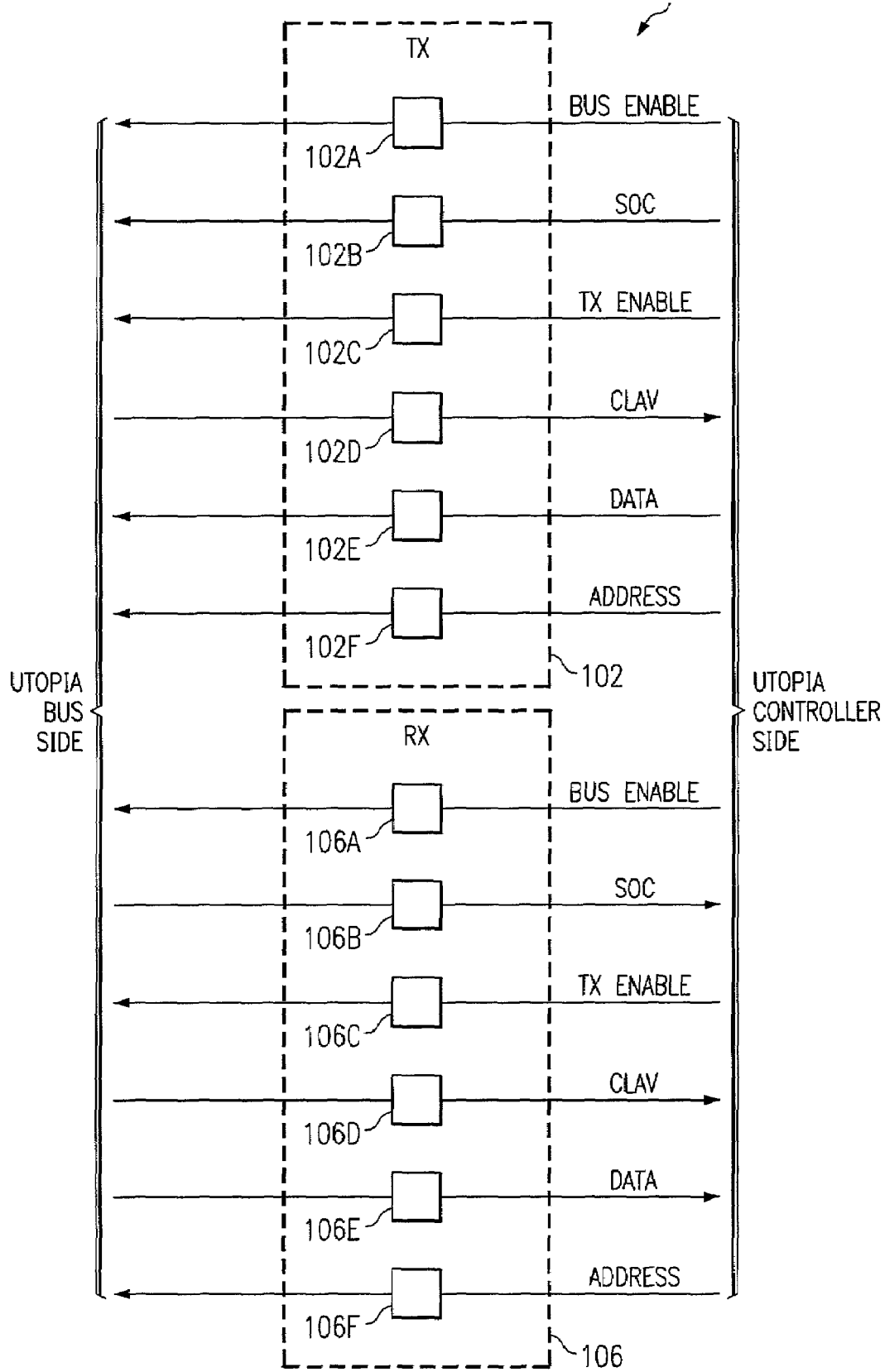
FIG. 2B is a block diagram showing additional details of a pin group shown in FIG. 2A.

FIG. 2B illustrates additional details of pin group 98. In this embodiment, pin group 98 comprises transmit pin group 102 and receive pin group 106. Transmit pin group 102 is used to carry signals for transmitting data from UTOPIA bus controller group 90 to UTOPIA bus group 80. In one embodiment, pins 102A through 102C of transmit pin group 102 are used to send bus enable signals, SOC signals, and transmit enable signals, respectively, from UTOPIA bus controllers 90A through 90C to UTOPIA buses 80A through 80C. Pin 102D is used to receive, at UTOPIA bus controllers 90A through 90C, CLAV signals sent from UTOPIA buses 80A through 80C. Pins 102E and 102F are used to send data and addresses, respectively, from UTOPIA bus controllers 90A through 90C to UTOPIA buses 80A through 80C. For example, the respective bus enable signals of UTOPIA bus controllers 90A through 90C are multiplexed over pin 102A. The respective SOC signals of UTOPIA bus controllers 90A through 90C are multiplexed over pin 102B, and so on. Receive pin group 106 is used to carry signals for receiving data from UTOPIA bus group 80 at UTOPIA bus controller group 90. For example, pins 106A, 106C, and 106F are used to send bus enable signals, transmit enable signals, and addresses, respectively, from UTOPIA bus controllers 90A through 90C to UTOPIA buses 80A through 80C. Pins 106B, 106D, and 106E are used to send SOC signals, CLAV signals, and data, respectively, from UTOPIA bus group 80 to UTOPIA bus controller group 90. In a manner that is similar to the signals of pin group 102, the various signals of UTOPIA buses 80A through 80C and UTOPIA bus controllers 90A through 90C are multiplexed over their corresponding pins 106A through 106F. Although twelve pins 102A through 102F and 106A through 106F are shown in FIG. 2B, more or less pins may be required to allow communication between one bus and one bus controller in a particular line card, as determined by one skilled in the art. In some embodiments, the number of pins in a pin group is of minor relevance, as long as signals from at least two sources are multiplexed over a pin. As discussed above, such multiplexing of signals through the same pin lowers the pin count in some embodiments of the invention.

Figure 3:
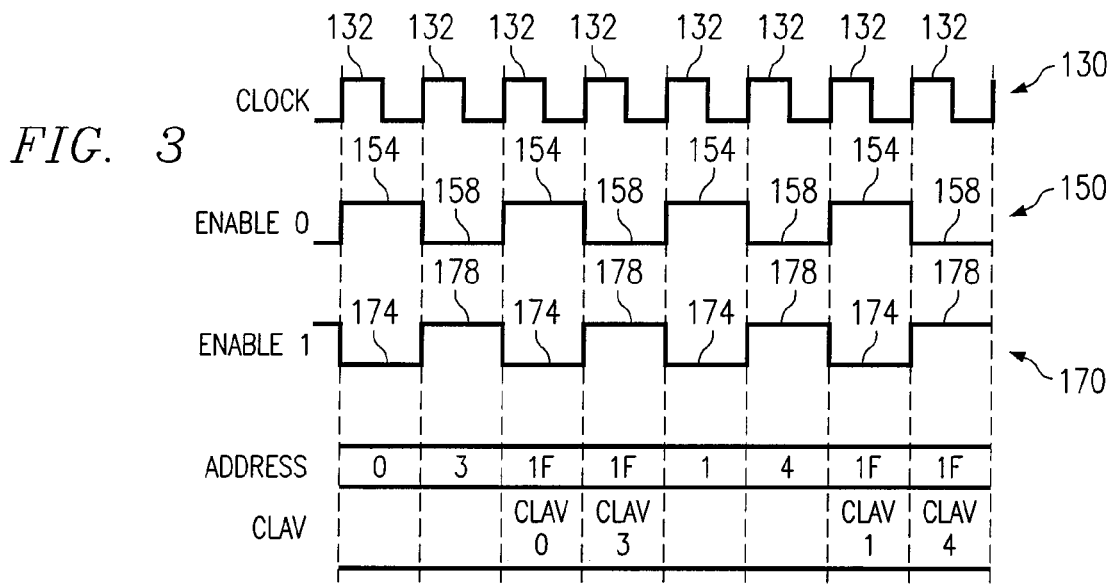
FIG. 3 is a block diagram showing additional details of one embodiment of multiplexing signals for the UTOPIA bus group and the UTOPIA bus controller group shown in FIG. 2A.

FIG. 3 illustrates details of one embodiment of multiplexing signals for UTOPIA bus group 80 and UTOPIA bus controller group 90, showing multiplexing of signals from two transmitters, such as UTOPIA bus controllers 90A and 90B. However, the details shown in FIG. 3 may apply to more than two transmitters.

FIG. 3 shows a graphic depiction of a clock signal 130 of a UTOPIA bus controller, an enable signal 150 of a first UTOPIA bus, and an enable signal 170 of a second UTOPIA bus. Each one of enable signals 150 and 170 is a graphical illustration of time periods in which a device is enabled to exchange signals with an associated device. In one embodiment, clock signal 130 may have a frequency at the operating clock rate of UTOPIA bus controllers 90A and 90B. Enable signal 150 may be associated with UTOPIA bus 80A. Enable signal 170 may be associated with UTOPIA bus 80B. However, any UTOPIA bus or UTOPIA bus controller may be associated with enable signals 150 and 170. Clock signal 130 comprises a plurality of cycles 132. Enable signal 150 comprises a plurality of ON periods 154 and a plurality of OFF periods 158. In one embodiment, each one of ON periods 154 is followed by one of OFF periods 158. Enable signal 170 also comprises a plurality of OFF periods 174 and a plurality of ON periods 178. In one embodiment, each one of OFF periods 174 is followed by one of ON periods 178. Each one of ON periods 154 and 178 and each one of OFF periods 158 and 174 occurs within one cycle 132. In one embodiment, each one of ON periods 154 occurs in the same cycle 132 as one of OFF periods 174. Each one of OFF periods 158 occurs in the same cycle 132 as one of ON periods 178. Although each ON period 154 is followed by one of OFF periods 158 and each OFF period 174 is followed by one of ON periods 178 in some embodiments of the invention, other embodiments of the inventions may have ON and OFF periods that alternate differently. For example, more than one ON period 154 may be followed by more than one OFF period 158. In another example, more than one OFF period 174 may be followed by more than one ON period 178.

During ON periods 154, UTOPIA bus 80A may exchange or anticipate exchanges of signals with UTOPIA bus controller 90A. During OFF periods 158, no signals are exchanged between UTOPIA bus BOA and UTOPIA bus controller 90A. However, during ON periods 178, which coincides in cycle 132 with OFF periods 158, UTOPIA bus 80B may exchange or anticipate exchanges of signals with UTOPIA bus controller 90B. However, during OFF periods 174, no signals are exchanged between UTOPIA bus 80B and UTOPIA bus controller 90B. Examples of signals that may be exchanged during ON periods 154 and 178 are bus enable signals, SOC signals, transfer enable signals, CLAV signals, data, and addresses.

An example of the communication of signals within ON periods 154 and 178 may be as follows. During one ON period 154, UTOPIA bus 80A may receive an address signal over a pin, such as pin 102A. The address signal is graphically depicted as a "0" in the "address" line shown in FIG. 3. Over the same pin, UTOPIA bus 80B may receive an address signal, depicted as a "3" in the same "address" line during one subsequent ON period 178. During a subsequent ON period 154 when UTOPIA bus 80A may be in a wait mode (depicted as an "1F" in the "address" line shown in FIG. 3), UTOPIA bus 80A may send a CLAV signal (depicted as "CLAV 0" in the "CLAV" line shown in FIG. 3) over pin 102D. During a subsequent ON period 178 when UTOPIA bus 80B may be in a wait mode (depicted as an "1F" in the "address" line shown in FIG. 3), UTOPIA bus 80B may send a CLAV signal (depicted as "CLAV 3" in the "CLAV" line shown in FIG. 3) over pin 102D. During a subsequent ON period 154, another address signal (depicted as a "1" in the "address" line shown in FIG. 3) may be received by UTOPIA bus 80A over pin 102A. During a subsequent ON period 178, another address signal (depicted as a "4" in the "address" line shown in FIG. 3) may be received by UTOPIA bus 80B over pin 102A. During the next ON period 154 when UTOPIA bus 80A may be in a wait mode (depicted as a "1F," in the "address" line shown in FIG. 3) UTOPIA bus 80A may send a CLAV signal (depicted as "CLAV 1" in the "CLAV" line shown in FIG. 3) over pin 102D. During the next ON period 178 when UTOPIA bus 80B may be in a wait mode (depicted as a "1F" in the "address" line) UTOPIA bus 80B may send a CLAV signal (depicted as "CLAV 4" in the "CLAV" line) over pin 102D. This process may be continuous, with different types of signals communicated during different ON periods 154 and 178. Examples of such signals are SOC signals, data, and addresses. Furthermore, different pins may be used for different types of signal, as described above.

In one embodiment, the proportion of the number of cycles 132 occupied by ON periods 154 and 178 changes if the number of UTOPIA bus—UTOPIA bus controller pairs in a group changes. That is because each transmitter, such as UTOPIA bus controller 90A, must have its respective proportion of transmission time that is made available by MUX/DEMUX 96. For example, in an embodiment of the invention shown in FIG. 2A where there are three UTOPIA buses 80A through 80C in UTOPIA bus group 80, one way to divide time for multiplexing would be for each transmitter having an associated enable signal to receive every third cycle 132 for its ON periods. As such, each UTOPIA bus 80A through 80C may occupy a third of the time block made available by MUX/DEMUX 96. Because FIG. 3 shows two enable signals 150 and 170 associated with UTOPIA buses 80A and 80B respectively, ON periods 154 and 178 each occupy approximately half of the number of cycles 132.

In one embodiment, clock signal 130 may be faster than an original clock signal that was used prior to the introduction of MUX/DEMUX 96. In such an embodiment, clock signal 130 is at a faster rate to compensate for the decrease in communication speed due to the use of MUX/DEMUX 96. For example, if MUX/DEMUX 96 multiplexes communications of UTOPIA buses 80A and 80B, each one of UTOPIA buses 80A and 80B may communicate at only half of the time allowed by the original clock signal. To compensate for the resulting decrease in communication speed, clock signal 130 may be twice the speed of the original clock signal, in some embodiments. Thus, the devices that are associated with enable signal 150 and enable signal 170, respectively, may communicate as if each is using all of the time allowed by the original clock signal 130. Increasing the clock rate from clock rate 130 is advantageous in some embodiments of the invention because the rate of communication between customer premises 20 and network 24 is not noticeably affected by the multiplexing of signals between a UTOPIA bus group and a UTOPIA bus controller group.

In another embodiment, clock signal 130 may be eliminated. Instead, enable signals 150 and 170 may be used as clock signals. Using the enable signals 150 and 170 as clock signals is advantageous because PHYs, such as PHYs 108, do not need to be modified to receive extra signals, such as clock signal 130. As such, off-the-shelf PHYs may be used in some embodiments of the invention, which reduces the cost of manufacturing line cards, such as line card 70.

Figure 4A:
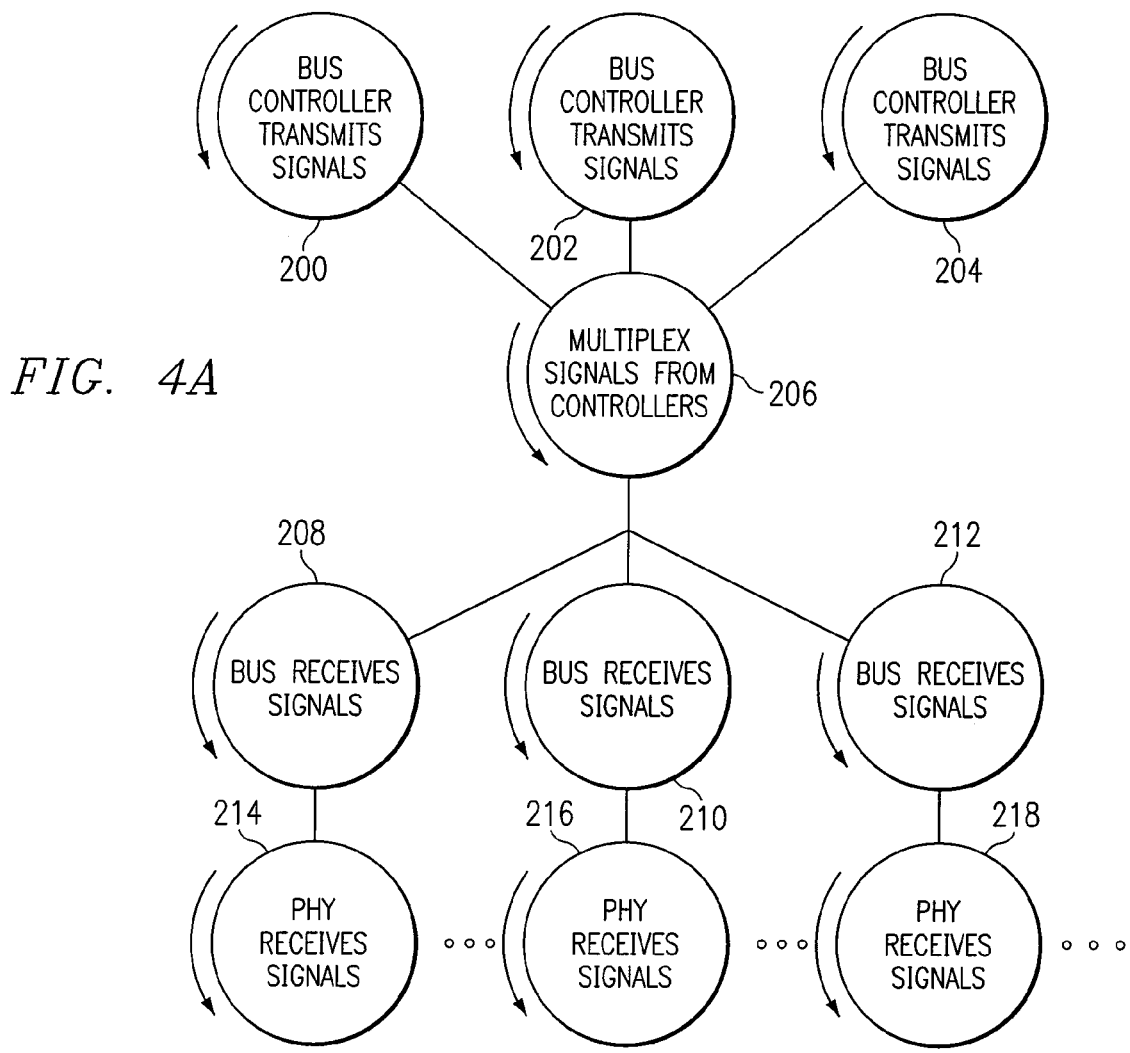
FIG. 4A is a state diagram of an embodiment of the system shown in FIG. 2A in operation, where UTOPIA bus controllers are sending signals to UTOPIA physical devices through their respectively associated UTOPIA buses.
Figure 4B:
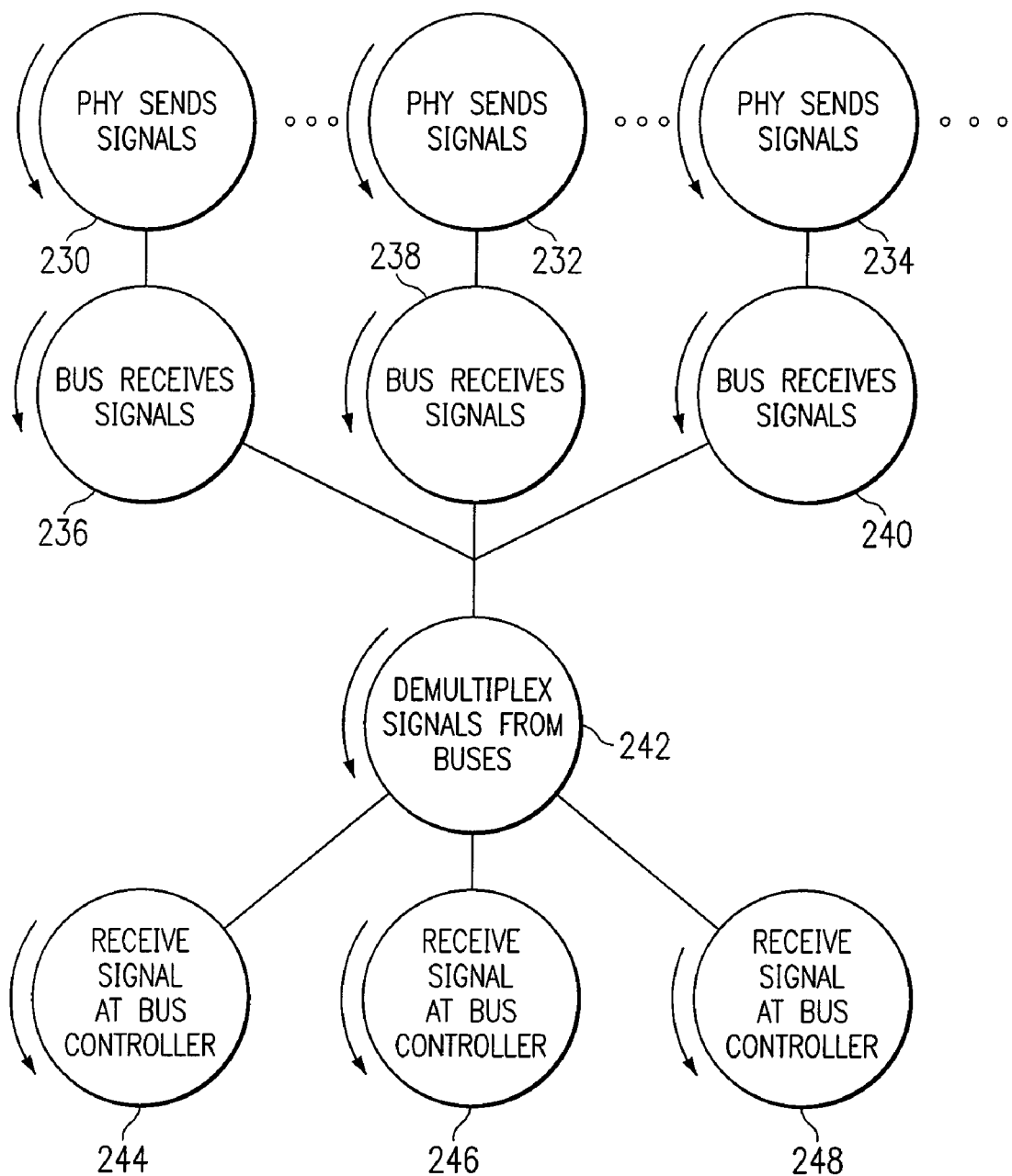
FIG. 4B is a state diagram of an embodiment of the system shown in FIG. 2A in operation, where UTOPIA physical devices are sending signals to their respective UTOPIA bus controllers through their respective UTOPIA buses.

FIGS. 4A and 4B are state diagrams of an embodiment of system 10 in operation. FIG. 4A illustrates an example of UTOPIA bus controllers 90A through 90C of system 10 sending signals to PHYs 108 using their respectively associated UTOPIA buses 80A through 80C. Conversely, FIG. 4B illustrates an example of PHYs 108 sending signals, through their respective UTOPIA buses 80A through 80C, to their respective UTOPIA bus controllers 90A through 90C. Although UTOPIA bus controllers 90A through 90C and their respective UTOPIA buses 80A through 80C are used in FIG. 4A to describe one embodiment of the invention, any number of UTOPIA buses and the respective UTOPIA bus controllers may benefit from the embodiment of the invention illustrated in FIG. 4A. Additionally, although UTOPIA bus controllers 90A through 90C and their respective UTOPIA buses 80A through 80C are used in FIG. 4B to describe one embodiment of the invention, any number of UTOPIA buses and the respective UTOPIA bus controllers may benefit from the embodiment of the invention illustrated in FIG. 4B.

Referring now to FIG. 4A, UTOPIA bus controller 90A transmits a signal intended for a particular PHY 108 associated with UTOPIA bus 80A to MUX/DEMUX 96 at step 200. At step 202, UTOPIA bus controller 90B transmits a signal intended for a particular PHY 108 associated with UTOPIA bus 80B to MUX/DEMUX 96. At step 204, UTOPIA bus controller 90C transmits a signal intended for a particular PHY 108 associated with UTOPIA bus 80C to MUX/DEMUX 96. Steps 200, 202, and 204 may be performed by the respective UTOPIA bus controllers 90A through 90C simultaneously or substantially simultaneously, so that the signals may be multiplexed. Then at step 206, MUX/DEMUX 96 multiplexes the received signals over a single line, such pin 98, to UTOPIA buses 80A through 80C. At step 208, UTOPIA bus 80A receives the signal from UTOPIA bus controller 90A and sends the signal to the particular PHY 108 associated with UTOPIA bus 80A. At step 210, UTOPIA bus 80B receives the signal from UTOPIA bus controller 90B and sends the signal to the particular PHY 108 associated with UTOPIA bus 80B. At step 212, UTOPIA bus 80C receives the signal from UTOPIA bus controller 90C and sends the signal to the particular PHY 108 associated with UTOPIA bus 80C. In one embodiment of the invention where TDM is used, steps 208, 210, and 212 may be performed one after another. However, other methods of multiplexing may allow the steps 208, 210, and 212 to be performed simultaneously or substantially simultaneously. At steps 214, 216, and 218, PHYs 108 receive their respective signals. In one 30; embodiment of steps 200, 202, 204, 208, 210, and 218, UTOPIA bus group 80 and UTOPIA bus controller group 90 operate at an operating clock rate that is faster than the original operating clock rate that was used prior to the introduction of a multiplexer. For example, the new, faster clock rate may be equal to a multiple of the original operating clock rate of those groups 80 and 90 and the number of UTOPIA bus-UTOPIA bus controller pairs whose signals are multiplexed over a single pin. In this example, the new clock rate is three times the original clock rate.

In another embodiment of the invention, UTOPIA bus controllers 90A through 90C continually send signals to MUX/DEMUX 96 at steps 200, 202, and 204 respectively. MUX/DEMUX 96 continually multiplexes the received signals at step 206. UTOPIA buses 80A through 80C continually receive their respective signals at steps 208, 210, and 212 respectively. PHYs 108 continually receive their respective signals at steps 214, 216, and 218, respectively.

Referring now to FIG. 4B, PHYs 108 associated with UTOPIA bus 80A send their respective signals to MUX/DEMUX 96 over UTOPIA bus 80A at step 230. PHYs 108 associated with UTOPIA bus 80B send their respective signals to MUX/DEMUX 96 over UTOPIA bus 80B at step 232. PHYs 108 associated with UTOPIA bus 80C send their respective signals to MUX/DEMUX 96 over UTOPIA bus 80C at step 234. At step 242, MUX/DEMUX 96 demultiplexes the signals from PHYs 108 of steps 230, 232, and 234. At step 244, UTOPIA bus controller 90A receives the signal from the PHY 108 of step 230. At step 246, UTOPIA bus controller 90B receives the signal from the PHY 108 of step 232. At step 248, UTOPIA bus controller 90C receives the signal from the PHY 108 of step 234. In one embodiment of steps 236, 238, 240, 244, 246, and 248, UTOPIA bus group 80 and UTOPIA bus controller group 90 operate at an operating clock rate that is faster than the original operating clock rate that was used prior to the introduction of a multiplexer. For example, the new, faster clock rate may be equal to a multiple of the original operating clock rate of those groups 80 and 90 and the number of UTOPIA bus-UTOPIA bus controller pairs whose signals are multiplexed over a single pin. In this example, the new clock rate is three times the original clock rate.

In another embodiment of the invention, PHYs 108 continually send their respective signals at steps 230, 232, and 234 respectively. UTOPIA buses 80A through 80C are continually used to transmit signals to MUX/DEMUX 96. MUX/DEMUX 96 continually demultiplexes the received signals at step 242. UTOPIA bus controllers 90A through 90C continually receive signals from MUX/DEMUX 96 at steps 244, 246, and 248 respectively.

Methods and systems described in detail above offer a solution to the increasing pin count on devices such as FPGA 86. One benefit from some embodiments of the invention is that the pin count is lowered while maintaining the same or higher network interface capability. Another benefit of some embodiments of the invention is that the lower pin count provides more space on the board for other devices, increasing the potential of maximizing the capability of DSLAMs. Another benefit from some embodiments of the invention is that the cost of implementing UTOPIA bus controllers is lowered because unnecessary internal gates can be avoided by having fewer pins.

Although the present invention has been described in detail, it should be understood that various changes, substitutions, and alterations can be made hereto without departing from the spirit and the scope of the invention as defined by the appended claims.

What is claimed is:

1. A system for managing communication in a network line card, the system comprising:
   at least two UTOPIA bus controllers, each UTOPIA bus controller operable to control a particular one of a plurality of UTOPIA buses;
   at least two sets of UTOPIA physical devices associated with respective ones of the UTOPIA bus controllers, each set coupled to a respective one of the UTOPIA buses, and each set addressed by one and only one of the at least two UTOPIA bus controllers;
   a multiplexer coupled to the UTOPIA bus controllers, the multiplexer operable to perform time division multiplexing utilizing a predetermined number of equal time slots, each of the UTOPIA buses controlled by one and only one of the at least two UTOPIA bus controllers during each time slot; and
   a same pin coupling each of the UTOPIA buses to the respective UTOPIA bus controllers through the multiplexer.

2. The system of claim 1, wherein each of the UTOPIA bus controllers and each of the UTOPIA buses has an operational clock rate that is faster than an output rate of the network line card.

3. The system of claim 1, wherein each of the UTOPIA bus controllers and each of the UTOPIA buses has an operational clock rate that is a multiple of an output rate of the network line card and a number of the UTOPIA buses in the plurality of UTOPIA buses.

4. The system of claim 1, wherein the multiplexer is operable to assign, to each of the UTOPIA buses, a particular portion of time during which the each of the UTOPIA buses is enabled to communicate with a particular one of the UTOPIA bus controllers.

5. The system of claim 1, wherein the multiplexer is operable to demultiplex signals from the at least two sets of UTOPIA physical devices.

6. The system of claim 1, wherein the at least two UTOPIA bus controllers are disposed in a field programmable gate array.

7. The system of claim 1, wherein the each of the UTOPIA bus controllers is operable to send an enable signal to a respectively associated set of the at least two sets of UTOPIA physical devices, the enable signal comprising a plurality of periods during which the each of the UTOPIA bus controllers is operable to communicate with any one of the UTOPIA physical devices in the respectively associated set.

8. A system for managing communication in a network line card having an output rate, the system comprising:
   at least two UTOPIA bus controllers, each UTOPIA bus controller operable to control a particular one of a plurality of UTOPIA buses and having an operational clock rate that is faster than the output rate of the network line card;
   at least two sets of UTOPIA physical devices associated with respective ones of the UTOPIA bus controllers, each set coupled to a respective one of the UTOPIA buses, and each set addressed by one and only one of the at least two UTOPIA bus controllers;
   a multiplexer coupled to the UTOPIA bus controllers, the multiplexer operable to perform time division multiplexing utilizing a predetermined number of equal time slots, each of the UTOPIA buses controlled by one and only one of the at least two UTOPIA bus controllers during each time slot; and a same pin coupling the UTOPIA buses to the UTOPIA bus controllers through the multiplexer.

9. The system of claim 8, wherein the operational clock rate is a multiple of the output rate of the network line card and a number of the UTOPIA buses in the plurality of UTOPIA buses.

10. The system of claim 8, wherein the multiplexer is operable to assign, to each of the UTOPIA buses, a particular portion of time represented by the operational clock rate, the each of the UTOPIA buses enabled, during the assigned particular portion of time, to communicate with a particular one of the UTOPIA bus controllers that is operable to control the each of the UTOPIA buses.

11. The system of claim 8, wherein the multiplexer is operable to demultiplex signals from the at least two sets of UTOPIA physical devices.

12. The system of claim 8, wherein the at least two UTOPIA bus controllers are disposed in a field programmable gate array.

13. A method for saving space on a network line card in a communications server, the method comprising:

providing a plurality of UTOPIA physical devices coupled to respective UTOPIA buses, each one of the UTOPIA buses coupled to a same pin on an integrated circuit having a plurality of UTOPIA bus controllers;

multiplexing a plurality of signals transmitted from each of a plurality of the UTOPIA bus controllers for receipt by respective ones of the UTOPIA physical devices by dividing time into an equal number of time slots, the multiplexed transmissions flowing through the same pin; and receiving signals on each one of the UTOPIA buses during each equal time slot from one and only one of the at least two UTOPIA bus controllers.

14. The method of claim 13, and further comprising operating the UTOPIA bus controllers at an operational rate that is faster than an output rate of the network line card.

15. The method of claim 13, and further comprising operating the UTOPIA bus controllers at an operational rate that is a multiple of an output rate of the network line card and a number of the UTOPIA bus controllers in the plurality of UTOPIA bus controllers.

16. The method of claim 13, wherein the signals are a plurality of first signals, and further comprising demultiplexing a plurality of second signals transmitted from the UTOPIA physical devices to the UTOPIA bus controllers, the second signals transmitted through the single pin.

17. The method of claim 13, wherein multiplexing a plurality of signals from each of a plurality of the UTOPIA bus controllers comprises providing, for the each of the UTOPIA bus controllers, a plurality of time periods when the each of the UTOPIA bus controllers is enabled to communicate with a particular one of the UTOPIA buses that is controlled by the each of the UTOPIA bus controllers, wherein each one of the time periods is mutually exclusive of each other of the time periods.

18. The method of claim 13, wherein at least one of the plurality of signals is selected from the group consisting of an enable signal, a start of cell signal, a cell available signal, data, and an address.

19. The method of claim 13, and further comprising sending an enable signal from the each of the plurality of the UTOPIA bus controllers for receipt by the respective ones of the UTOPIA physical devices, wherein the enable signal includes a plurality of time periods during which the each of the plurality of the UTOPIA bus controllers is operable to communicate with any one of the respective ones of the UTOPIA physical devices.

20. The method of claim 13, and further comprising:

sending an enable signal from the each of the plurality of the UTOPIA bus controllers for receipt by the respective ones of the UTOPIA physical devices, wherein the enable signal includes a plurality of time periods during which the each of the plurality of the UTOPIA bus controllers is operable to communicate with any one of the respective ones of the UTOPIA physical devices; and using, at the each of the UTOPIA physical devices, the respective enable signal as an operational clock signal.

21. A method for saving space on a network line card having an output rate, the method comprising:

providing a plurality of UTOPIA physical devices coupled to respective UTOPIA buses, each one of the UTOPIA buses coupled to a same pin on an integrated circuit having a plurality of UTOPIA bus controllers;

multiplexing a plurality of signals transmitted from each of a plurality of the UTOPIA bus controllers for receipt by respective ones of the UTOPIA physical devices by dividing time into an equal number of time slots, the multiplexed transmissions flowing through the same pin;

receiving signals on each one of the UTOPIA buses during each equal time slot from one and only one of the at least two UTOPIA bus controllers; and operating the UTOPIA bus controllers at an operational rate that is faster than the output rate of the network line card.

22. The method of claim 21, wherein the operational rate is a multiple of the output rate of the network line card and a number of the UTOPIA bus controllers in the plurality of UTOPIA bus controllers.

23. The method of claim 21, wherein the signals are a plurality of first signals, and further comprising demultiplexing a plurality of second signals transmitted from the UTOPIA physical devices to the UTOPIA bus controllers, the second signals transmitted through the single pin.

24. The method of claim 21, wherein multiplexing a plurality of signals from each of a plurality of the UTOPIA bus controllers comprises providing, for the each of the UTOPIA bus controllers, a plurality of time periods when the each of the UTOPIA bus controllers is enabled to communicate with a particular one of the UTOPIA buses that is controlled by the each of the UTOPIA bus controllers, wherein each one of the time periods is mutually exclusive of each other of the time periods.

25. The method of claim 21, wherein at least one of the plurality of signals is selected from the group consisting of an enable signal, a start of cell signal, a cell available signal, data, and an address.

26. A system for managing communication in a network line card having a plurality of UTOPIA buses, the system comprising:

a plurality of controlling means, each one of the plurality of controlling means operable to control a particular one of the plurality of UTOPIA buses;

at least two sets of UTOPIA physical devices associated with respective ones of the plurality of controlling means, each set coupled to a respective one of the UTOPIA buses, and each set addressed by one and only one of the plurality of controlling means; and means for multiplexing a plurality of signals transmitted from each of the plurality of controlling means for receipt by respective ones of the UTOPIA physical devices, all of the multiplexed transmissions flowing through a same means for carrying the plurality of signals; each of the UTOPIA physical devices controlled by the multiplexed transmissions received from one and only one of the plurality of controlling means.

* * * * *